Sept. 16, 1969  N. C. SCHLEGEL, JR., ET AL  3,467,423
GARNISHING BEAD MITER JOINT AND METHOD OF MAKING SAME
Original Filed June 14, 1965

INVENTOR.
NORMAN C. SCHLEGEL, JR.
BY ALAN P. MICHELS

*Cumpston + Shaw*

ATTORNEYS

United States Patent Office 3,467,423
Patented Sept. 16, 1969

3,467,423
GARNISHING BEAD MITER JOINT AND METHOD OF MAKING SAME
Norman C. Schlegel, Jr., Pittsford, and Alan P. Michels, Penn Yan, N.Y., assignors to The Schlegel Manufacturing Company, Rochester, N.Y., a corporation of New York
Continuation of application Ser. No. 463,833, June 14, 1965, now abandoned. This application June 7, 1967, Ser. No. 644,404
Int. Cl. F16b 1/00, 7/04
U.S. Cl. 287—189.36     5 Claims

ABSTRACT OF THE DISCLOSURE

This invention relates to an improved miter joint between pieces of trim strip or garnishing bead or the like, and more particularly, to an improved miter joint between trim strips or garnishing beads at least partially formed of thermoplastic material so that the outer surface thereof comprises thermoplastic material.

---

This is a continuation of application Ser. No. 463,833, filed June 14, 1965, now abandoned.

Garnishing beads are presently used in large quantities in motor vehicles for trimming structural edges, and such garnishing beads often are formed at least in part of thermoplastic material. Garnishing beads that are commercially successful at present comprise a wire or metal frame of generally U shape and a thermoplastic material which is coated or extruded onto such frame. Various devices such as fins, grippers, tangs, etc., are used to secure such garnishing strips in place on structural edges.

An object of the invention is to make an improved miter joint between strips of garnishing bead so that the joint is neat, strong, and allows the garnishing bead to be fitted in place around angled corners.

Another object of the invention is to make a miter joint between strips of garnishing bead by a relatively simple and economical method which produces a strong and attractive joint of the desired angle.

Other objects of the invention will be apparent hereinafter from the specification and from the recital of the appended claims. To these and other ends, the invention resides in certain improvements, all as will hereinafter be more fully described, the novel features being pointed out in the claims at the end of this specificaion.

Figure 1:
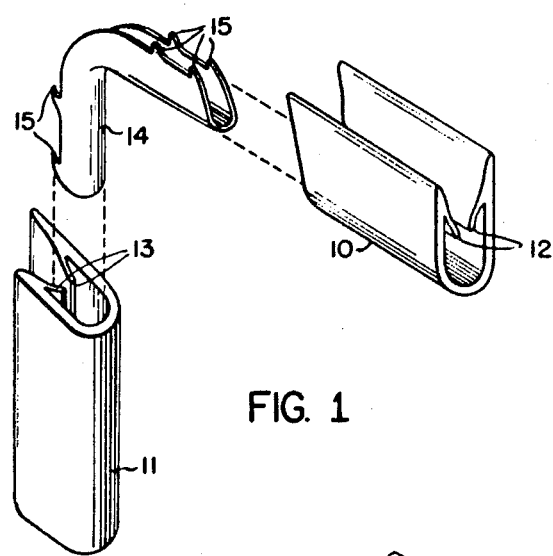
FIG. 1 is an isometric view of a reinforcing corner key and a pair of garnishing bead strips to be connected together in an improved miter joint according to the inventor.

Referring to the drawings in which corresponding parts have been given the same reference numerals, the inventive miter joint is illustrated by the joining together of garnishing bead pieces 10 and 11 in a right-angled miter joint. However, it is possible according to the invention to join garnishing bead strips at angles other than right angles. Also, one preferred form of garnishing bead is illustrated in the drawings, but the inventive joint is not limited to any particular form of garnishing bead.

The illustrated garnishing bead pieces 10 and 11 are substantially channel- or U-shaped and are preferably formed of a bendable stamped metal or wire frame onto which a suitable thermopalstic material is extruded.

Figure 2:
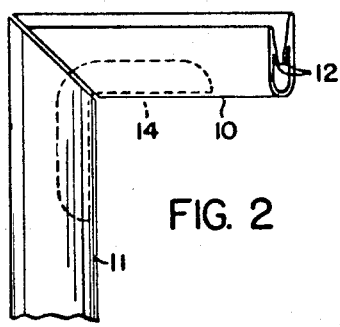
FIG. 2 shows a side elevation of garnishing bead strips ready to be joined together according to the invention.

Garnishing bead strips 10 and 11 are preferably formed with integral gripping fins 12 and 13 respectively which extend downwardly at an angle toward the inside bottom of the channel for gripping the side surfaces of a structural member. The ends of strips 10 and 11 which are to be joined are preferably beveled or cut at approximately one-half the angle of the desired joint. Thus, as best shown in FIG. 2, the ends of strips 10 and 11 are cut at approximately a 45° angle to form the right-angle miter joint illustrated.

A corner key 14 reinforces the inventive miter joint. Key 14 has a pair of legs extending at the angle of the desired joint and adapted to be inserted into the mitered ends of garnishing bead pieces 10 and 11. Corner key 14 is preferably formed of a thin sheet of metal, and its leg portions are preferably configured to a channel or U shape corresponding to the channel shape of garnishing bead strips 10 and 11. The channel-shaped leg portions of reinforcing key 14 are preferably disposed against the inside surfaces of strips 10 and 11, and a structural edge on which the joined beading strips are fitted can extend down into the channeled portions of reinforcing member 14.

It is preferred that reinforcing key 14 be fitted into beading strips 10 and 11 below the portions of such strips that are adapted to grip a structural edge to retain the beading in place. In the illustrated embodiment, the legs of key 14 are disposed against the inside channel surfaces of strips 10 and 11 below the respective projecting fins 12 and 13.

As best shown in FIG. 1, the leg portions of reinforcing member 14 can be provided with teeth 15 that are preferably angled so that each leg of member 14 can be inserted into the beveled end of the garnishing bead strip, and teeth 15 will bite into the undersurface of fins or other structure inside the garnishing bead to prevent the withdrawal of key 14. Teeth 15 thus provide added resistance to the separation of strips 10 and 11 joined according to the invention. Of course, teeth 15 can be angled outward to bite into the side walls of garnishing bead strips to be joined according to the invention, and a strong and satisfactory joint can be made without using teeth 15.

After reinforcing key 14 is inserted into the mitered ends of strips 10 and 11 respectively, strips 10 and 11 are preferably moved to the position illustrated in FIG. 2 in which their mitered ends are slightly separated. In such relative position, molten thermoplastic material is preferably injected into the space between the ends of strips 10 and 11 and adjacent the ends of such strips to fuse or weld the strips together. The thermoplastic material used for such injection is preferably the same material which coats the outside of strips 10 and 11. The resultant joint, as best shown in FIG. 3, has a bead 16 of thermoplastic material filling the space between the ends of strips 10 and 11 and fusing such strips together.

To form the bead 16 joining strips 10 and 11 together, it is preferred that strips 10 and 11, assembled as shown in FIG. 2, be inserted into a mold which closely engages strips 10 and 11 and bridges the space between their mitered ends. Molten thermoplastic material is then injected into the mold cavity so as to be forced into the space between the mitered ends of strips 10 and 11 and over the surface of strips 10 and 11 immediately adjacent their mitered ends to form the bead 16 best shown in FIG. 3. Bead 16 bonds together the thermoplastic coatings on strip 10 and 11 and fills the space between their mitered ends to form a sturdy and secure miter joint. Because the preferred mold restrains the flow of plastic material forming bead 16 to the area of the bead as illustrated in FIG. 3, the resulting miter joint according to the invention is neat and attractive as well as strong and secure.

Figure 3:
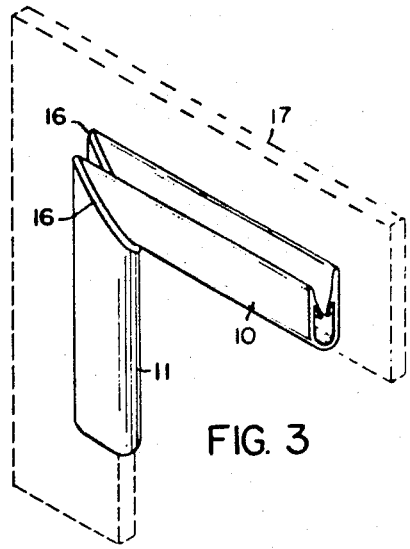
FIG. 3 shows an isometric view of garnishing bead strips joined according to the invention and mounted on a structural edge.

Joined strips 10 and 11 can be fitted onto angled structural member 17, as illustrated in FIG. 3, by merely forcing the joined strips over the side surfaces of structure 17 at the angle therein. Structure 17 then extends to near the bottom of the channel in each of the strips 10 and 11, the channel-shaped leg portions of the reinforcing member 14 allowing structural edge 17 to extend to near the bottom of strips 10 and 11 even at the angled corner in structure 17.

The inventive joint can be formed at any angle including a straight 180° angle, and the joint can be formed between opposite ends of a single piece of beading formed into a closed curve. The ends to be joined can be cut or trimmed to any convenient angles, the sum of which is the desired angle, and in this connection, "mitered" is used throughout the specification and claims to refer to the dividing of the angle of the joint by cutting the joined ends to two angles which are preferably, but not necessarily, equal.

While the invention has been disclosed herein with reference to the details of a preferred embodiment thereof, it is to be understood that such disclosure is intended in an illustrative, rather than a limiting, sense, and it is contemplated that various modifications of the procedures and construction will readily occur to those skilled in the art.

We claim:

1. An improved garnishing bead miter joint comprising:
    (a) two strip portions of said garnishing bead, each of said strip portions being generally U-shaped in cross section and having opposed leg portions for straddling a structural edge;
    (b) each of said strip portions having a thermoplastic material disposed continuously around the outside of said bead and at least part way along the inside surfaces of said leg portions of said bead from the free edges of said leg portions;
    (c) means formed on said leg portions of said bead and extending into the inside of said U-shape for engaging said structural edge to retain said bead in mounted position thereon;
    (d) mutually confronting ends of said strip portions being disposed in mitered relationship at the desired angle of said joint, said leg portions of said strip portions being disposed for straddling said structural edge continuously around said angle of said joint;
    (e) a reinforcing key having a pair of legs disposed relative to one another at substantially said angle of said joint, each of said legs being generally U-shaped in cross section;
    (f) said key being disposed to bridge said joint with each of said legs of said key being inserted into a respective one of said confronting ends of said strip portions with said legs of said key disposed to conform to the inside bottom of each respective one of said U-shape strip portions with the opposing side walls of said U-shaped legs of said key arranged for straddling said structural edge with said bead, and with said legs of said key disposed between said inside bottom of each respective one of said strip portions and said engaging means; and
    (g) said thermoplastic material of said respective strip portions being joined together at said confronting ends continuously around said outside of said bead, and part way along the inside surfaces of said leg portions of said bead from the free edges of said leg portions to the region of said engaging means.

2. The miter joint of claim 1 wherein said engaging means comprises an opposed pair of fins of said thermoplastic material projecting downward and inward into said U-shaped portions from said leg portions of said bead to form gripping projections, and wherein said thermoplastic material of at least a portion of said fins is joined together at said confronting ends.

3. The miter joint of claim 2 wherein said legs of said key are provided with teeth oriented to face outward toward said free edges of said leg portions of said bead and arranged for biting into the underside of said fins to prevent separation of said strip portions.

4. The miter joint of claim 1 wherein said legs of said key are provided with teeth arranged for biting into inside surfaces of said strip portions to prevent separation of said strip portions.

5. The miter joint of claim 1 including a bead of thermoplastic material disposed between said confronting ends of said strip portions continuously around said outside of said strip portions and part way along said inside surfaces of said leg portions of said strip portions from the free edges of said leg portions to the region of said engaging means for bonding together said thermoplastic material.

References Cited

UNITED STATES PATENTS

| | | | |
|---|---|---|---|
| 898,751 | 9/1908 | Krantz. | |
| 1,817,162 | 8/1931 | Mulligan | 287—189.36 |
| 2,989,788 | 6/1961 | Kessler | 287—189.36 |
| 3,034,612 | 5/1962 | Jourdan | 287—189.36 |
| 3,183,560 | 5/1965 | Brichard | 287—189.36 X |
| 3,222,769 | 12/1965 | Le Plae | 52—716 |

CARL W. TOMLIN, Primary Examiner

W. L. SHEDD, Assistant Examiner

U.S. Cl. X.R.

52—716